United States Patent [19]

Sims

[11] Patent Number: 5,704,387
[45] Date of Patent: Jan. 6, 1998

[54] PROPANE RESERVE SYSTEM

[76] Inventor: Donald G. Sims, 3340 26 Mile Rd., Shelby Township, Mich. 48316

[21] Appl. No.: 543,512

[22] Filed: Oct. 16, 1995

[51] Int. Cl.$^6$ .................................................. B67D 5/04
[52] U.S. Cl. .................... 137/263; 137/861; 137/881; 180/314
[58] Field of Search .................... 137/263, 255, 137/597, 861, 877, 878, 881; 180/314

[56] References Cited

U.S. PATENT DOCUMENTS

| | | |
|---|---|---|
| 2,168,701 | 8/1939 | Buttner . |
| 2,172,863 | 9/1939 | Buttner . |
| 2,176,580 | 10/1939 | Buttner . |
| 2,609,669 | 9/1952 | Eddy . |
| 2,679,332 | 5/1954 | Humbarger . |
| 3,001,541 | 9/1961 | St. Clair . |
| 3,254,697 | 6/1966 | Parks . |
| 3,512,795 | 5/1970 | Naeve . |
| 3,540,550 | 11/1970 | Bailey . |
| 3,710,809 | 1/1973 | Brown et al. ............. 137/266 X |
| 3,731,805 | 5/1973 | Schniers . |
| 3,820,560 | 6/1974 | Leemann . |
| 3,884,255 | 5/1975 | Merkle . |
| 3,893,678 | 7/1975 | Engdahl . |
| 3,916,938 | 11/1975 | Hack . |
| 4,166,713 | 9/1979 | Debrey . |
| 4,188,969 | 2/1980 | Lotton et al. . |
| 4,306,579 | 12/1981 | Kelly ........................ 137/263 X |
| 4,546,750 | 10/1985 | Brunell et al. . |
| 4,585,052 | 4/1986 | Kaneko et al. . |
| 4,874,013 | 10/1989 | Hack, Jr. . |
| 5,046,945 | 9/1991 | McGowan . |
| 5,163,466 | 11/1992 | Moody . |
| 5,360,034 | 11/1994 | Der Manuelian . |
| 5,411,058 | 5/1995 | Welsh et al. . |

*Primary Examiner*—Kevin Lee
*Attorney, Agent, or Firm*—Harness, Dickey & Pierce, P.L.C.

[57] ABSTRACT

A propane reserve system for providing propane fuel to propane driven equipment. The propane reserve system includes a standard tank and reserve tank interconnected by a supply network such that the standard tank simultaneously supplies fuel to the propane driven equipment and the reserve tank, if needed. The supply network generally includes a standard tank effluent conduit, a reserve tank inflow conduit, a reserve tank effluent conduit and an output conduit meeting at a junction and a plurality of vanes restricting fuel flow through the network. A flow restrictor coupled to the reserve tank inflow conduit cooperates with one of the valves to limit flow into the reserve tank thereby allowing the effluent from the primary tank to fill the reserve tank while also powering the equipment.

29 Claims, 4 Drawing Sheets

PROPANE RESERVE SYSTEM

BACKGROUND OF THE INVENTION

1. Technical Field

This invention generally relates to an apparatus for supplying fuel to an output and, more particularly, to a propane reserve system for use with a propane powered forklift including a plurality of conduits and valves arranged to govern fuel flow between a standard propane tank, a reserve tank and an output.

2. Discussion

Propane, a colorless gas at ambient temperatures, is often marketed and used to power industrial equipment, to heat homes and as fuel for residential grills. While propane is a relatively clean burning fuel that may be transported and stored at remote locations easily and inexpensively, it is often difficult for users to accurately measure fuel levels in propane cylinders. This difficulty often results in propane powered equipment running out of fuel at inopportune times or in areas where changing fuel cylinders is unsafe or inconvenient. Further, as federal regulations limit the areas in which propane cylinders may be exchanged, the materials used to construct propane storage tanks and the hoses and valves used in propane fuel systems, the unexpected exhaustion of a fuel container often presents refueling difficulties.

The prior art has addressed the general problem of fuel exhaustion through the use of dual tank systems. Reference may be made to U.S. Pat. No. 4,166,713 to Debrey, U.S. Pat. No. 4,874,013 to Hack, U.S. Pat. No. 5,046,945 to McGowan and U.S. Pat. No. 5,411,058 to Welsh, et at. for a discussion of dual tank systems for supplying fuel to an output. However, the prior an has failed to provide a fuel supply apparatus wherein the primary fuel tank powers a propane engine or output while simultaneously filling a reserve fuel tank when the fluid pressure in the primary tank exceeds the fluid pressure in the reserve tank by a predetermined amount.

The present invention provides the above discussed benefit while also preventing back flow from the reserve tank to the primary tank when the fluid pressure in the primary tank is less than that in the reserve tank. As a result, an operator of propane powered equipment using the novel fuel delivery apparatus disclosed herein is assured of having a predetermined amount of fuel in the reserve tank available for powering the equipment after the fuel in the primary tank is exhausted.

SUMMARY OF THE INVENTION

One object of the present invention is to provide a fuel delivery apparatus that conveys fuel from a primary storage tank to an output while simultaneously filling a reserve tank when the fluid pressure in the primary tank exceeds the fluid pressure in the reserve tank by a predetermined amount.

Another object of the present invention is to restrict the flow of fuel from the primary tank to the reserve tank so that fuel is delivered to the output at a rate sufficient to power the output.

A further object of the present invention is to prevent back flow from the reserve tank to the primary tank when the fluid pressure in the reserve tank exceeds the fluid pressure in the primary tank.

Accordingly, the present invention provides a fuel reserve and delivery apparatus for use with equipment, such as a forklift, operated by propane fuel. The apparatus includes a standard propane tank, a reserve tank and a supply network of conduits and valves arranged to allow the standard propane tank to supply fuel to the equipment while simultaneously filling the reserve tank or maintaining the reserve tank in a full condition.

Specifically, in a preferred embodiment, the supply network includes a primary tank effluent conduit, a reserve tank inflow conduit, a reserve tank effluent conduit and an output conduit all hydraulically interconnected at a junction. A plurality of check valves, biased in a closed position to prevent flow therethrough unless the pressure difference across the vane is sufficient to overcome the biasing force of the valve, are connected to the conduits and regulate flow between the primary tank, reserve tank and output so as to provide the aforementioned benefits and objectives.

BRIEF DESCRIPTION OF THE DRAWINGS

The objects and features of this invention will become further apparent from a reading of the following detailed description taken in conjunction with the drawings, in which.

DETAILED DESCRIPTION OF THE PREFERRED EMBODIMENT

Figure 1:
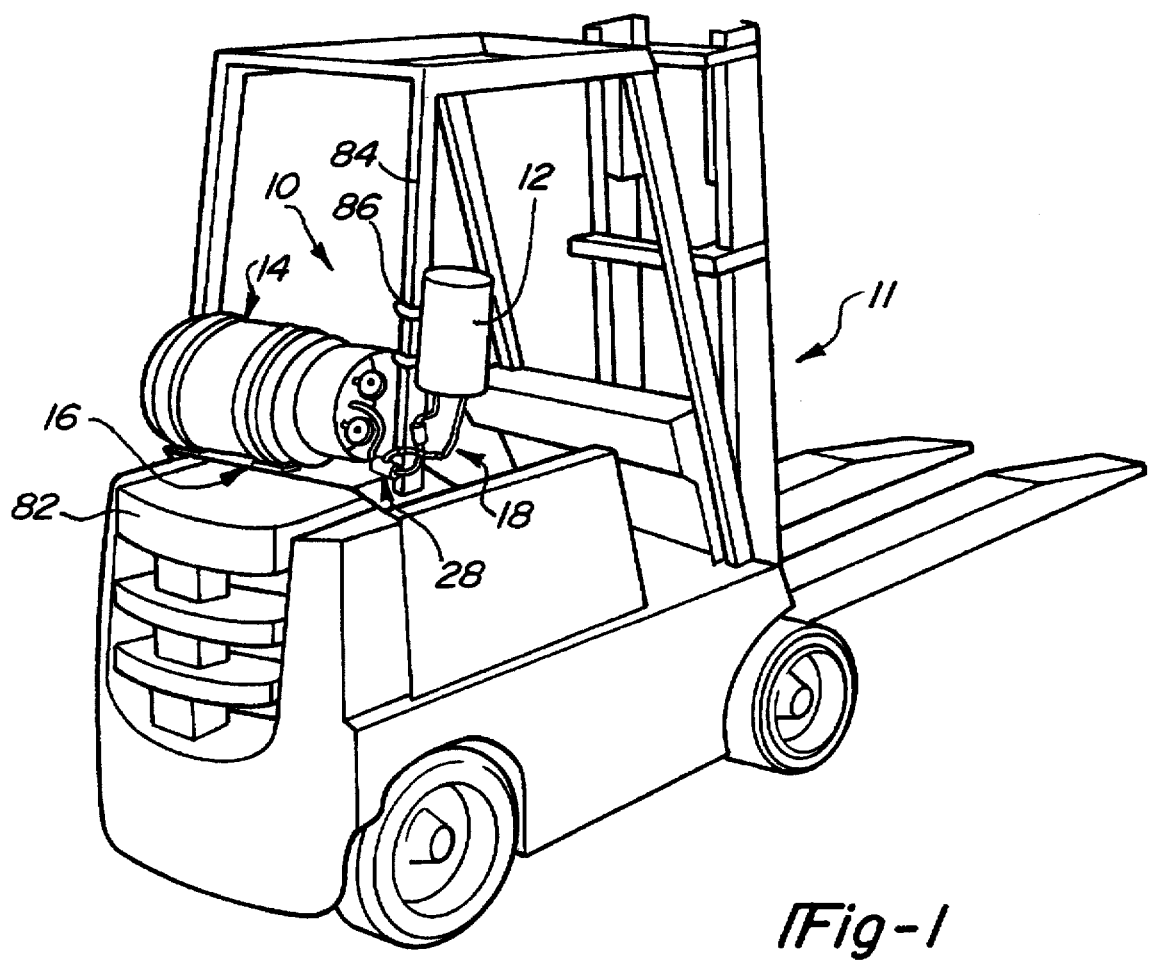
FIG. 1 illustrates a propane powered forklift including a propane reserve system in accordance with the present invention.

As illustrated in FIG. 1, the present invention generally includes a propane reserve system 10 connectable to a forklift 11 or other propane fueled apparatus. Propane reserve system 10 includes a primary or standard tank 14 and a reserve tank 12 interconnected by a supply network 18. In FIG. 1, primary tank 14 is secured to and supported by counterweight 82 of forklift 11 while reserve tank 12 and a supply network junction 28 are secured to a roll bar 84 such as by straps 86. It should be appreciated that propane reserve system 10 can be used with most any propane fueled apparatus to which the system can be connected by methods known in the art.

Figure 2:
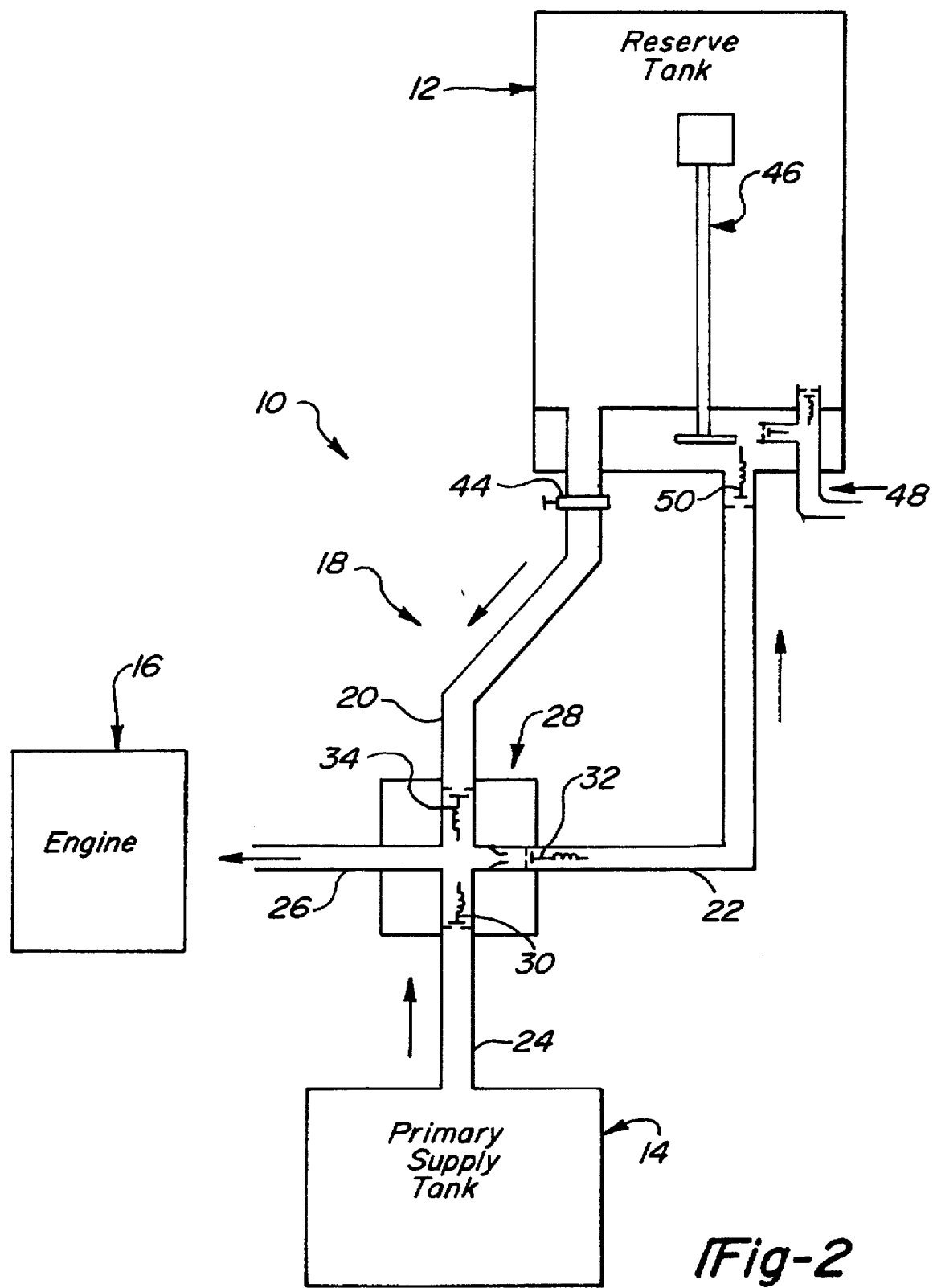
FIG. 2 illustrates the propane reserve system shown in FIG. 1 including the standard tank, reserve tank, conduit junction and valve arrangement.

As best seen in FIG. 2, supply network 18 includes a series of hoses or conduits 20, 22, 24 and 26 and a plurality of valves 30, 32 and 34 operative to allow standard tank 14 to simultaneously fill reserve tank 12 and power an engine or other propane fueled apparatus 16. As a result of the present invention, when the fuel supply in primary tank 14 is exhausted, reserve tank 12 provides a reliable source of fuel sufficient to operate propane fueled apparatus 16 until primary tank 14 can be replaced in a safe manner. While it is preferred that conduits 20, 22, 24 and 26 meet at a junction 28, it will be appreciated that the benefits and objectives of the present invention may be achieved without a four-way junction such as that shown in FIG. 1 so long as conduits 20, 22, 24 and 26 hydraulically communicate with one another.

Figure 3:
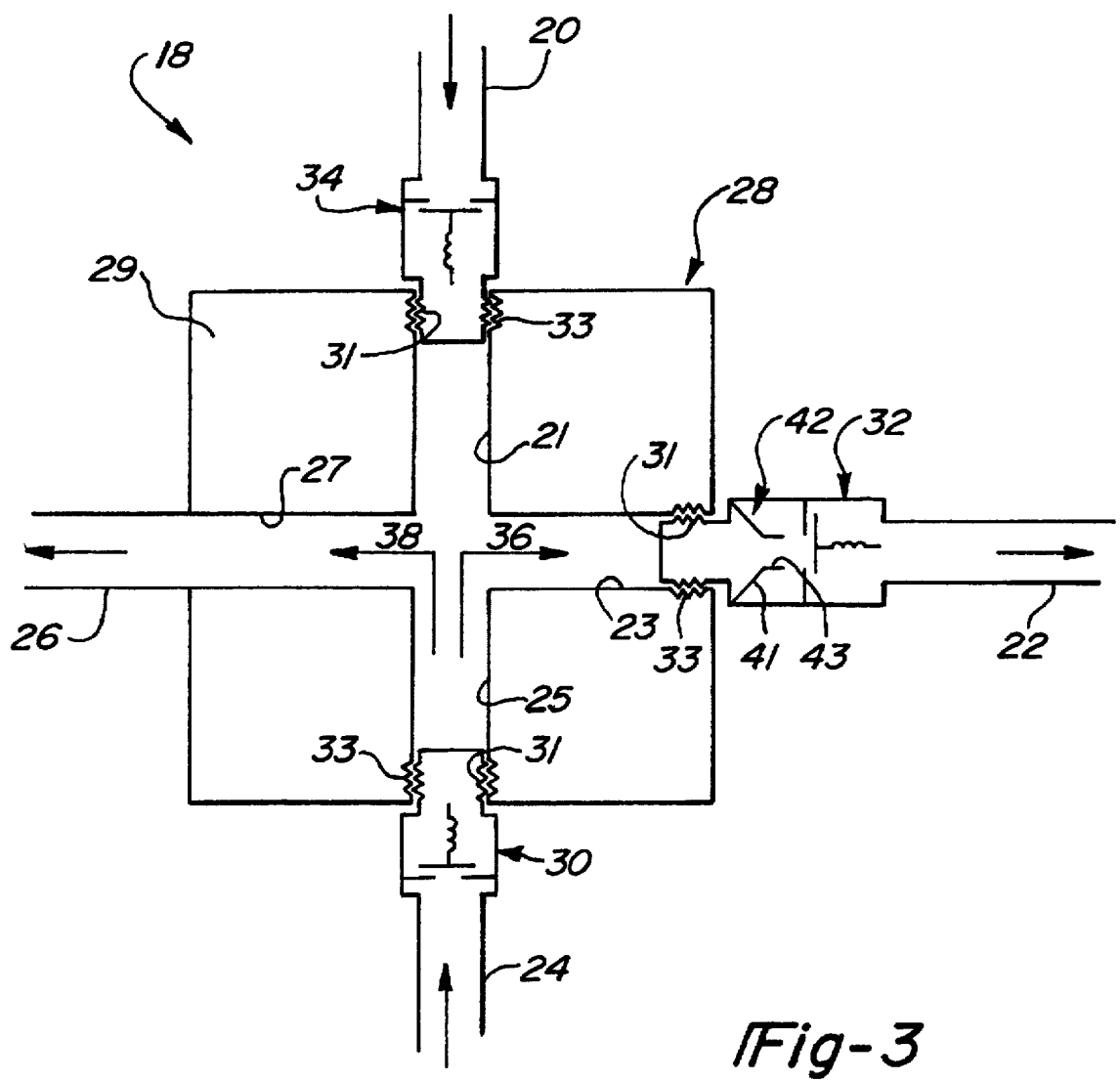
FIG. 3 is an enlarged view of the conduit junction and vane arrangement of the reserve system shown in FIG. 2.

Junction 28 and the conduits and valves proximate thereto are best seen in FIG. 3 wherein a first check vane 30, connected to junction 28 and a primary tank effluent conduit 24, is biased to prevent flow from junction 28 into standard propane tank 14. Further, a second check valve 32 is coupled to junction 28 and biased to prevent flow from reserve tank 12 to junction 28 through a reserve tank inflow conduit 22. A third check valve 34, connected to a reserve tank effluent conduit 20, is biased to prevent fuel flow from junction 28 into reserve tank 12. As will be appreciated by those skilled in the art, the supply network 18 shown in FIG. 3 allows propane fuel to flow from standard tank 14 to propane fueled apparatus 16 through junction 28 and output conduit 26 as shown by arrow 38 when the pressure in primary tank 14 exceeds the pressure at junction 28 by an amount sufficient to overcome the biasing force of check vane 30. Additionally, reserve tank 12 is filled by fuel flowing from primary tank 14 through conduit 22 as shown by arrow 36 when the pressure in standard tank 14 exceeds the pressure in reserve tank 12 by an amount sufficient to overcome the biasing force of second valve 32.

A flow restrictor 42 is provided in conduit 22 to restrict fuel flow through reserve tank inflow conduit 22 thereby allowing standard tank 14 to slowly fill reserve tank 12 while simultaneously providing sufficient fuel to operate apparatus 16. Flow restrictor 42 is shown to include a body 41 defining an orifice 43. To effectively restrict flow in conduit 22, orifice 43 has a smaller flow opening than conduit 22. It will be appreciated that other methods of restricting flow through conduit 22 would be apparent to one skilled in the art. For example, conduit 22 could include a hose having a smaller diameter than conduits 24 and 26 or a flow restricting valve could be used as valve 32 thereby eliminating the need for a separate flow restrictor.

It is contemplated that junction 28 may include a housing 29 having a plurality of passages 21, 23, 25 and 27 as shown in FIG. 3. Passages 21, 23 and 25 preferably include internal threads 33 cooperative with external threads 31 formed on vanes 30, 32 and 34 to removably connect valves 30, 32 and 34 to housing 29. Alternatively, it will be appreciated by those skilled in the art that housing 29 may encompass the operative components of the invention including vanes 30, 32 and 34 and flow restrictor 42 thereby providing the benefits of the invention through the use of a single, compact unit. Hoses, conduits or other connectors can be used to connect junction housing 29 and valves 30, 32 and 34 to existing dual tank fuel supply systems as shown in FIG. 1.

When standard tank 14 is empty or otherwise unable to supply sufficient fuel to engine 16, the operator opens shut off vane 44 (FIG. 2) thereby allowing fuel to flow from reserve tank 12 to engine 16 if the pressure difference across third valve 34 exceeds the biasing force thereof. While reserve tank 12 powers engine 16, check valve 30 prevents fuel from entering standard tank 14 from junction 28. Similarly, when standard tank 14 is supplying fuel to engine 16, third vane 34 prevents fuel flow to reserve tank 12 through conduit 20 should the operator fail to close shut off valve 44. Shut off valve 44 may be manually, mechanically or electrically operative between a closed position wherein no flow passes therethrough and an open position wherein a fluid or gas passes freely therethrough.

Figure 4:
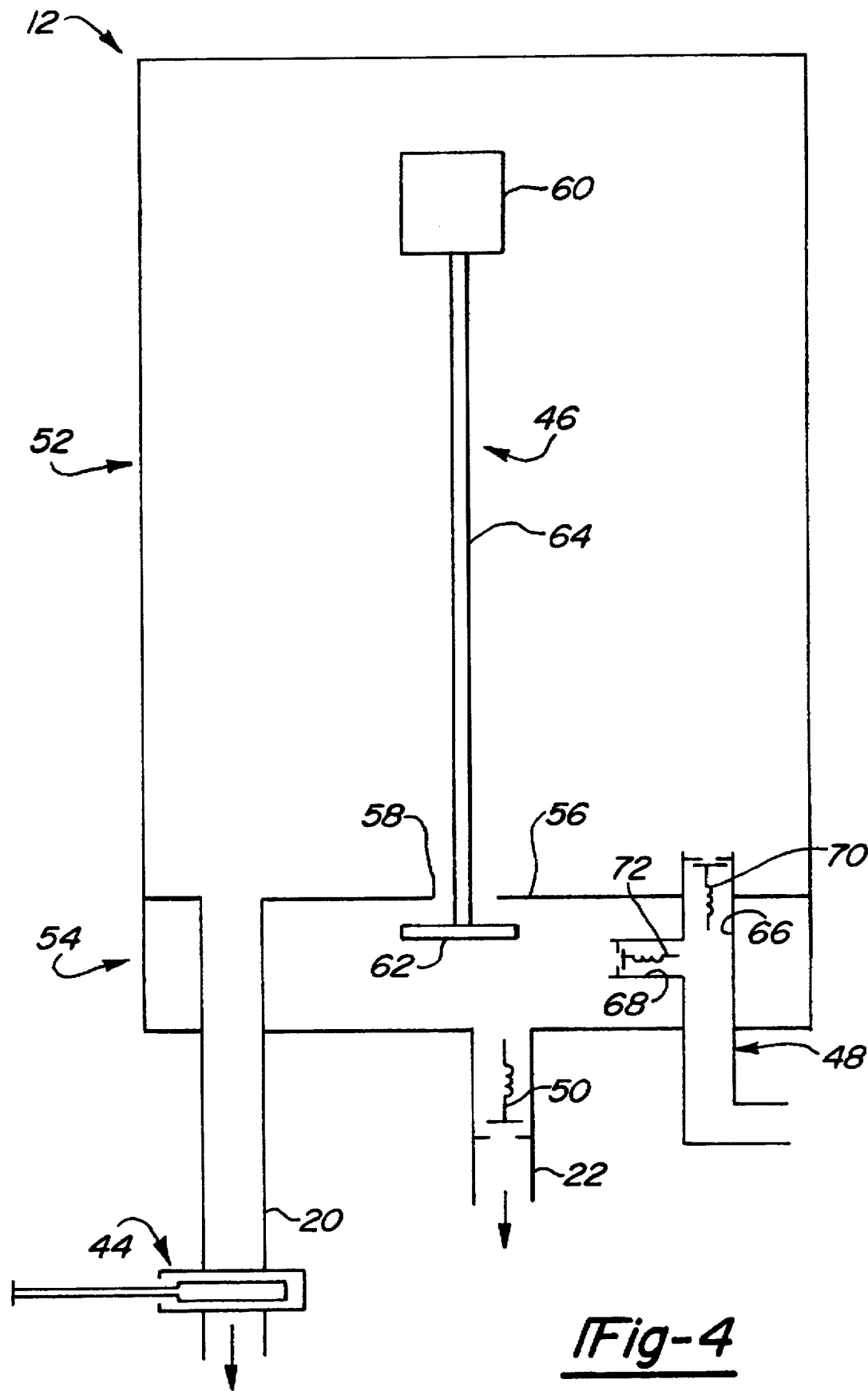
FIG. 4 is an enlarged view of the reserve tank shown in FIGS. 1, 2 and 3 including the conduits and valves associated therewith.

As best seen in FIG. 4, reserve tank 12 includes a float 46 and is connected to reserve tank inflow conduit 22, reserve tank effluent conduit 20 and a pressure relief vent 48. A check vane 50, preferably disposed proximate to reserve tank 12, is biased to prevent fuel loss from reserve tank 12 in the event conduit 22 is defective. For the same reason, shut off valve 44 is preferably located proximate to reserve tank 12 as is shown in FIGS. 2 and 4.

Many of the float and relief vent arrangements known in their respective arts may be used in the present invention. As best seen in FIG. 4, it is contemplated that reserve tank 12 includes an upper section 52 and a lower section 54 separated by a generally horizontal wall 56 having an aperture 58 formed therein. Float 46 includes buoyant member 60 and a seat 62 interconnected by a body 64 disposed within aperture 58. In operation, propane fuel enters lower section 54 of reserve tank 12 through conduit 22, fills lower section 54 before passing through aperture 58 and entering upper section 52 of reserve tank 12. As the fuel level in reserve tank 12 approaches a predetermined "full" level, buoyant member 60 rises until seat 62 seals against the portion of generally horizontal wall 56 surrounding aperture 58. Fuel continues to enter lower section 54 until the pressure difference across check valve 32 no longer exceeds the biasing force therein.

Pressure relief vent 48 is shown to include a first passage 66 hydraulically connected to upper section 52 and a second passage 68 hydraulically connected to lower section 54 of reserve tank 12. Check valves 70 and 72 are connected to first and second passages 64 and 66, respectively, and prevent fuel flow therethrough unless the pressure in the respective tank section exceeds a predetermined value.

While pressure sensitive valves 30, 32, 34, 50, 70 and 72 are referred to herein and shown in the drawings as spring biased check valves, it will be appreciated that other arrangements known in the art may be used. For example, one skilled in the art might use shut off vanes mechanically actuated in response to electrical signals generated by pressure sensors disposed within conduits 20, 22 and 24 or within tanks 12 and 14 and junction 28, without departing from the scope of the disclosed invention. However, for simplicity, portability and durability, spring biased check valves are preferred.

The novel propane reserve system and apparatus disclosed herein provides a propane fuel supply to an engine or other propane driven equipment and includes a supply network interconnecting a standard tank, reserve tank and propane powered apparatus such that the standard tank may fill the reserve tank while simultaneously powering the apparatus. Then, upon exhaustion of the fuel in the primary tank, the reserve tank permits operation of the equipment until the standard tank can be replaced in a safe location and in a safe manner.

Various other advantages and modifications will become apparent to one skilled in the an after having the benefit of studying the teachings of the specification, the drawings and the following claims.

What is claimed is:

1. A fluid delivery apparatus including a primary tank, a reserve tank, an output and a conduit assembly interconnecting the primary tank, reserve tank and output, said conduit assembly comprising:

a first conduit connectable to the primary tank and in fluid communication with the output, said first conduit including a first valve operative to move from a closed position to an open position in response to a predetermined pressure drop from said primary tank to the output, said first vane allowing flow in said first conduit when said first valve is in said open position;

a second conduit connectable to the reserve tank and in fluid communication with said first conduit, said second conduit including a second valve operative to move from a closed position to an open position in response to a predetermined pressure drop from said primary tank to said reserve tank, said second valve allowing flow in said second conduit when in said open position, said second conduit further including restricting means for limiting flow in said second conduit when said second valve is in said open position; and a third conduit connectable to said reserve tank and in fluid communication with the output, said third conduit including a shut off valve moveable from an open position to a closed position and a third valve operative to move from a closed position to an open position in response to a predetermined pressure drop from said reserve tank to the output, said third valve allowing flow in said third conduit when in said open position.

2. The conduit assembly of claim 1 wherein said first conduit, second conduit and third conduit are coupled to one another at a junction and wherein said conduit assembly further includes a fourth conduit hydraulically connecting said junction to the output.

3. The conduit assembly of claim 1 wherein said restricting means includes a body disposed within said second conduit, said body including an orifice whereby flow through said second conduit is limited to the flow through said orifice.

4. The conduit assembly of claim 2 wherein said first valve, second valve and third valve are spring biased check valves.

5. The conduit assembly of claim 4 wherein said junction includes a plurality of threaded sections, and wherein said first, second and third valves each include threaded portions cooperative with said junction sections to removably connect said first, second and third valves to said junction.

6. A fluid delivery apparatus including a primary tank, a reserve tank, an output and a conduit assembly interconnecting the primary tank, reserve tank and output, said conduit assembly comprising:

a junction including a housing defining a cavity;

a first check valve operative to move from a closed position to an open position in response to a predetermined pressure drop from the primary tank to said junction cavity, said first check valve including biasing means for urging said first check valve into said closed position;

a second check valve operative to move from a closed position to an open position in response to a predetermined pressure drop from said junction cavity to the reserve tank, said second check valve including biasing means for urging said second check valve into said closed position;

a third check valve operative to move from a closed position to an open position in response to a predetermined pressure drop from the reserve tank to said junction cavity, said third check valve including biasing means for urging said third check valve into said closed position;

a shut off valve moveable from a closed position to an open position;

a first conduit hydraulically connecting said junction cavity and the primary tank when said first check valve is in said open position, said first conduit including a first hose assembly coupling said junction, said first check valve and the primary tank;

a second conduit hydraulically connecting said junction cavity and the reserve tank when said second check valve is in said open position, said second conduit including restricting means for limiting the flow therethrough, said second conduit further including a second hose assembly coupling said junction, said second check valve and the reserve tank;

a third conduit hydraulically connecting said junction cavity and the reserve tank when said shut off valve and said third check valve are each in said open positions, said third conduit including a third hose assembly coupling said junction, said third check valve, said shut off valve and the reserve tank; and an output conduit hydraulically connected to said junction cavity.

7. The conduit assembly of claim 6 wherein said restricting means includes a body coupled to said second check valve, said body including an orifice limiting flow through said second conduit.

8. The conduit assembly of claim 6 wherein said first, second and third check valves are threadably connected to said junction housing.

9. A four way junction for use in a fluid delivery system including an output, a primary supply tank, a reserve tank and a conduit assembly interconnecting said primary tank, reserve tank, output and junction, said junction comprising:

a housing defining a chamber;

a first valve coupled to said housing and hydraulically communicating with said chamber, said first valve including a first valve member moveable from a closed position to an open position and biasing means for urging said first valve member into said closed position;

a second valve coupled to said housing and hydraulically communicating with said chamber, said second valve including a second valve member moveable from a closed position to an open position and biasing means for urging said second valve member into said closed position;

a third valve coupled to said housing and hydraulically communicating with said chamber, said third valve including a third valve member moveable from a closed position to an open position and biasing means for urging said third valve member into said closed position; and a shut off valve coupled to said housing and hydraulically communicating with said third valve.

10. The junction of claim 9 wherein said first valve member is operative to move from said closed position to said open position when the pressure difference across said first valve in its closed position exceeds the force exerted by the biasing means associated with said first valve, wherein said second valve member is operative to move from said closed position to said open position when the pressure difference across said second valve in its closed position exceeds the force exerted by the biasing means associated with said second valve, and wherein said third valve member is operative to move from said closed position to said open position when the pressure difference across said third valve in its closed position exceeds the force exerted by the biasing means associated with said third valve.

11. The junction of claim 9 further including restricting means coupled to said second valve for limiting flow through said second valve when said second valve is in said open position.

12. The junction of claim 11 wherein said restricting means includes a body defining an orifice.

13. The junction of claim 9 wherein said first valve, second valve and third valve are threadably connected to said housing.

14. The junction of claim 13 wherein said junction chamber includes a first passage having internal threads, a second passage having internal threads and a third passage having internal threads, wherein said first valve includes a housing having external threads cooperative with said internal threads of said first passage to removably couple said first valve to said junction housing, wherein said second valve includes a housing having external threads cooperative with said internal threads of said second passage to removably couple said second valve to said junction housing, and wherein said third valve includes a housing having external threads cooperative with said internal threads of said third passage to removably couple said third valve to said junction housing.

15. A propane fueled apparatus comprising:
a body having a fuel supply conduit;
a primary tank coupled to said body;
a reserve tank coupled to said body;
switching means interconnecting said primary tank, said reserve tank, and said fuel supply conduit for selectively communicating fuel from one of said primary tank and said reserve tank to said fuel supply conduit and for communicating fuel from said primary tank to said reserve tank when the pressure in said primary tank exceeds the pressure in said reserve tank by a predetermined amount.

16. The propane fueled apparatus of claim 15 wherein said switching means includes a junction, a first conduit assembly, a second conduit assembly, and a third conduit assembly, said junction coupled to said body and including a housing defining a cavity hydraulically connected to said fuel supply conduit, said first conduit assembly hydraulically interconnecting said junction cavity and said primary tank and including a first valve operative to move from a closed position to an open position in response to a predetermined pressure drop from said primary tank to said junction cavity, said first valve allowing flow in said first conduit assembly when in said open position, said second conduit assembly hydraulically interconnecting said junction cavity and said reserve tank and including a second valve operative to move from a closed position to an open position in response to a predetermined pressure drop from said junction cavity to said reserve tank, said second valve allowing flow in said second conduit assembly when in said open position, said second conduit assembly further including restricting means for limiting the flow through said second conduit assembly when said second valve is in said open position, said third conduit assembly hydraulically interconnecting said junction cavity and said reserve tank and including a third valve operative to move from a closed position to an open position in response to a predetermined pressure drop from said reserve tank to said junction cavity, said third valve allowing flow in said third conduit assembly when in said open position.

17. The propane fueled apparatus of claim 16 wherein said junction cavity includes a first passage having internal threads, a second passage having internal threads and a third passage having internal threads, wherein said first valve includes a housing having external threads cooperative with said internal threads of said first passage to removably couple said first valve to said junction housing, wherein said second valve includes a housing having external threads cooperative with said internal threads of said second passage to removably couple said second valve to said junction housing, and wherein said third valve includes a housing having external threads cooperative with said internal threads of said third passage to removably couple said third valve to said junction housing.

18. The propane fueled apparatus of claim 17 wherein said first conduit assembly includes a hose hydraulically coupling said first valve and said primary tank, wherein said second conduit assembly includes a hose hydraulically coupling said second valve and said reserve tank, and wherein said third conduit assembly includes a hose hydraulically coupling said third valve and said reserve tank.

19. The propane fueled apparatus of claim 15 wherein said body is a forklift having a propane burning engine hydraulically connected to said fuel supply conduit.

20. The propane fueled apparatus of claim 15 wherein said reserve tank further includes a pressure relief vent and means for preventing overfilling of said reserve tank.

21. The propane fueled apparatus of claim 16 wherein said restricting means includes a body disposed within said second conduit, said body including an orifice whereby flow through said second conduit is limited to the flow through said orifice.

22. The propane fueled apparatus of claim 16 wherein said first valve, second valve, and third valve are spring biased check valves.

23. The propane fueled apparatus of claim 16 wherein said first valve includes a first valve member movable from a closed position to an open position and first biasing means for urging said first valve member into said closed position, said second valve including a second valve member movable from a closed position to an open position and second biasing means for urging said second valve member into said closed position, and said third valve including a third valve member movable from a closed position to an open position and third biasing means for urging said third valve member into said closed position.

24. A forklift comprising:
a body;
an engine coupled to said body;
a primary fuel tank coupled to said body;
a reserve fuel tank coupled to said body; and
switching means interconnecting said primary fuel tank, said reserve fuel tank, and said engine for selectively communicating fuel from one of said primary fuel tank and said reserve fuel tank to said engine and for communicating fuel from said primary tank to said reserve tank when the pressure in said primary tank exceeds the pressure in said reserve tank by a predetermined amount.

25. The forklift of claim 24 wherein said switching means includes a conduit hydraulically connecting said primary fuel tank and said reserve fuel tank, said conduit including flow limiting means for limiting fuel flow from said primary fuel tank to said reserve fuel tank whereby said primary tank fills said reserve fuel tank while supplying fuel to said engine.

26. The forklift of claim 24 wherein said switching means further includes a junction housing having a plurality of check valves being operative to prevent fuel flow from said reserve fuel tank to said primary fuel tank, prevent fuel flow from said primary fuel tank to said engine unless the pressure in said primary fuel tank exceeds a predetermined value, and prevent fuel flow from said reserve fuel tank to said engine unless the pressure in said reserve fuel tank exceeds the pressure in said primary fuel tank by a predetermined amount.

27. The forklift of claim 24 further including a strap coupling said reserve fuel tank to said body.

28. The forklift of claim 27 wherein said body includes a roll bar and wherein said strap couples said reserve fuel tank to said roll bar.

29. The forklift of claim 24 further including a strap wherein said switching means includes a junction housing and wherein said body includes a roll bar, said strap coupling said junction housing to said roll bar.

* * * * *